United States Patent
Dong et al.

(10) Patent No.: US 9,115,631 B2
(45) Date of Patent: Aug. 25, 2015

(54) METHOD FOR MONITORING COMPONENTS IN AN EXHAUST AFTER TREATMENT SYSTEM, AN EXHAUST AFTER TREATMENT SYSTEM, AND A CONTROLLER FOR AN EXHAUST AFTER TREATMENT SYSTEM

(75) Inventors: Qunlong Dong, Frederick, MD (US); Chun Tai, Hagerstown, MD (US)

(73) Assignee: Mack Trucks, Inc., Greensboro, NY (US)

( * ) Notice: Subject to any disclaimer, the term of this patent is extended or adjusted under 35 U.S.C. 154(b) by 0 days.

(21) Appl. No.: 14/400,604

(22) PCT Filed: Jun. 13, 2012

(86) PCT No.: PCT/US2012/042115
§ 371 (c)(1),
(2), (4) Date: Nov. 12, 2014

(87) PCT Pub. No.: WO2013/187888
PCT Pub. Date: Dec. 19, 2013

(65) Prior Publication Data
US 2015/0096283 A1 Apr. 9, 2015

(51) Int. Cl.
*F01N 3/00* (2006.01)
*F01N 11/00* (2006.01)
(Continued)

(52) U.S. Cl.
CPC .............. *F01N 11/002* (2013.01); *F01N 3/021* (2013.01); *F01N 3/2066* (2013.01); *F01N 3/106* (2013.01);
(Continued)

(58) Field of Classification Search
CPC ...... F01N 3/2066; F01N 11/002; F01N 3/021; F01N 2250/02; F01N 2550/04; F01N 2550/05; F01N 2560/026; F01N 2560/06; F01N 2560/14; Y02T 10/47
USPC ........................................................ 60/274
See application file for complete search history.

(56) References Cited

U.S. PATENT DOCUMENTS 6,487,852 B1  12/2002 Murphy et al.
6,983,589 B2   1/2006 Lewis, Jr. et al.
(Continued)

FOREIGN PATENT DOCUMENTS

WO   2012002973 A1   1/2012
WO   2012067617 A1   5/2012

OTHER PUBLICATIONS

International Preliminary Report on Patentability (Dec. 24, 2014) for corresponding International Application PCT/US2012/042115.
International Search Report (Sep. 6, 2012) for corresponding International Application PCT/US2012/042115.

*Primary Examiner* — Jason Shanske
(74) *Attorney, Agent, or Firm* — WRB-IP LLP

(57) ABSTRACT

Components in an exhaust after treatment system (EATS) for a diesel engine are monitored by measuring heat released (QDOC) across a diesel oxidation catalyst (DOC) and heat released (QEATS) across the DOC and a diesel particulate filter (DPF) during an A Hi injection event, by calculating heat input from AHI fuel (QAHI) during performance of the AH I injection event with a fully functioning AHI nozzle, and by measuring NOX conversion efficiency (nSCR) from NOX to N2 by a selective catalytic reduction system (SCR) at a condition where a SCR is sensitive to feeding gas compositions while AHI is not in use. Malfunctioning components are identified using these measurements and calculations.

21 Claims, 3 Drawing Sheets

(51) Int. Cl.
*F01N 3/021* (2006.01)
*F01N 3/20* (2006.01)
*F01N 3/10* (2006.01)
*F01N 13/00* (2010.01)

(52) U.S. Cl.
CPC .......... *F01N 13/009* (2014.06); *F01N 13/0097* (2014.06); *F01N 2550/02* (2013.01); *F01N 2550/04* (2013.01); *F01N 2550/05* (2013.01); *F01N 2560/026* (2013.01); *F01N 2560/06* (2013.01); *F01N 2560/14* (2013.01); *F01N 2900/1618* (2013.01); *F01N 2900/1621* (2013.01); *F01N 2900/1812* (2013.01); *Y02T 10/47* (2013.01)

(56) References Cited

U.S. PATENT DOCUMENTS

| | | | |
|---|---|---|---|
| 7,942,043 | B2 | 5/2011 | Liu et al. |
| 2007/0144151 | A1 | 6/2007 | Lueders et al. |
| 2007/0256407 | A1* | 11/2007 | Reuter ............ 60/286 |
| 2010/0242448 | A1* | 9/2010 | Mital ............. 60/286 |
| 2011/0011068 | A1* | 1/2011 | Ren et al. ........ 60/297 |
| 2011/0023460 | A1 | 2/2011 | Singh |
| 2011/0099982 | A1 | 5/2011 | Berke et al. |
| 2011/0270504 | A1* | 11/2011 | Barasa ........... 701/101 |
| 2011/0314793 | A1* | 12/2011 | Mullins et al. ....... 60/274 |
| 2012/0000187 | A1* | 1/2012 | Mullins et al. ....... 60/277 |

\* cited by examiner

| FAILURE COMPONENT | DOC HC SLIP FACTOR 1 – (QDOC/QEATS) | AHI FLOW LOSS FACTOR 1 – (QEATS/QAHI) | pSCR (HIGH FLOW AND LOW TEMPERATURE) |
|---|---|---|---|
| End-of-life DOC + End-of-life DPF + normal AHI Nozzle | R1 N/A | R2 (<25%) | R3 (≥90%) |
| Limit DOC + End-of-life DPF + normal AHI Nozzle | >R1 (>50%) | >R2 (>25%) | <R3 (<50%) |
| End-of-life DOC + Limit DPF + normal AHI Nozzle | <R1 (<10%) | >R2 (>25%) | <R3 (<50%) |
| End-of-life DOC + End-of-life DPF + AHI Nozzle losing flow | R1 N/A | >R2 (>25%) | R3 (≥90%) |
| Limit DOC + Limit DPF + normal AHI Nozzle | R1 (10% ~ 50%) | >R2 (>25%) | <R3 (<50%) |

FIG. 3

METHOD FOR MONITORING COMPONENTS IN AN EXHAUST AFTER TREATMENT SYSTEM, AN EXHAUST AFTER TREATMENT SYSTEM, AND A CONTROLLER FOR AN EXHAUST AFTER TREATMENT SYSTEM

BACKGROUND AND SUMMARY

The present invention relates generally to exhaust after treatment systems (EATS) and, more particularly, to methods and equipment for monitoring components in an EATS.

Government regulations impose strict limits for diesel engine exhaust with regard to, among other things, particulate and NOX emissions. Compliance with these regulations requires a multi-component EATS. A typical EATS will include a diesel oxidation catalyst (DOC), a diesel particulate filter (DPF), and a selective catalytic reduction catalyst system (SCR), as well as an AHI (Advanced Hydrocarbon Injection) nozzle (also known as a "seventh injector") for injecting fuel upstream of the DOC to facilitate heating of the EATS and regeneration of the DPF.

To ensure proper functioning of the DOC, it is known to monitor temperature downstream of the DOC and upstream of the DPF to diagnose a malfunctioning DOGC. If temperature is lower than expected, that may indicate a malfunctioning DOC. However, other problems with the EATS may also be the cause for lower than expected temperatures downstream of the DOC. For example, a clogged AHI nozzle will also result in temperatures downstream of the DOC and upstream of the DPF being lower than expected. Also, the method can not monitor the catalytic activity of a catalyzed DPF, which is also critical for controlling NMHC emissions and providing appropriate NO2/NOx ratio to a downstream SCR for optimal SCR NOx conversion efficiency. While it is possible to determine that the AHI nozzle is clogged by use of a flow meter in the AHI line, this solution adds substantial cost and complexity to the EATS and its control system. While it is also possible to use the SCR NOx conversion efficiency to provide some information about the feeding gas composition from an upstream DPF, there are a few other factors which can lead to lower than normal SCR NOx conversion efficiency other than feeding gas compositions, for example diesel emission fluid (DEF) dilution, degradation of SCR catalyst itself, clogged or leaking DEF loop, etc. A SCR can also be not sensitive to feeding gas compositions while the residence time of exhaust time is long or its inside temperature is high.

It is desirable to provide a method for monitoring several components of an EATS at once without adding substantially to the cost or complexity of the EATS or its control system.

According to an aspect of the present invention, a method is provided for monitoring components in an exhaust after treatment system (EATS) for a diesel engine, the EATS comprising, in order from upstream to downstream, an AHI nozzle, a diesel oxidation catalyst (DOC), a diesel particulate filter (DPF), and a selective catalytic reduction catalyst sytem (SCR). The method comprises measuring heat released (QDOC) across the DOC during an AHI injection event, measuring heat release from AHI fuel (QEATS) across the DOC and the DPF during the AHI injection event, measuring NOX conversion efficiency ($\eta$SCR) from NOX to N2 across the SCR while AHI is not in use, calculating heat input from AHI fuel (QAHI) during performance of the AHI injection event with a fully functioning AHI nozzle, calculating a DOC HC Slip Factor=1−(QDOC/QEATS), calculating an AHI Flow Loss Factor=1−(QEATS/QAHI), and identifying a malfunctioning AHI nozzle, DOC, DPF, or SCR by comparing each of calculated DOC HC Slip Factor, calculated AHI Flow Loss Factor, and measured NOX conversion efficiency with desired values.

According to another aspect of the present invention, an exhaust after treatment system (EATS) for a diesel engine is provided. The EATS comprises an AHI nozzle, a diesel oxidation catalyst (DOC) downstream from the AHI nozzle, a first temperature sensor upstream of the DOC, a diesel particulate filter (DPF) downstream of the DOC, a second temperature sensor downstream of the DOC and upstream of the DPF, a selective catalytic reduction catalyst system (SCR) downstream of the DPF, a third temperature sensor downstream of the DPF and upstream of the SCR, a first NOX sensor upstream of the SCR, a second NOX sensor downstream of the SCR, and a controller. The controller is arranged to determine heat released (QDOC) across the DOC during an AHI injection event based on a first temperature measurement signal and a second temperature measurement signal from the first temperature sensor and the second temperature sensor, respectively, determine heat released (QEATS) across the DOC and the DPF during the AHI injection event based on the first temperature measurement signal and a third temperature measurement signal from the first temperature sensor and the third temperature sensor, respectively, determine NOX conversion efficiency ($\eta$SCR) from NOX to N2 across the SCR while AHI is not in use based on NOX measurement signals from the first and second NOX sensors, calculate heat input from AHI fuel (QAHI) during performance of the AHI injection event with a fully functioning AHI nozzle, calculate a DOC HC Slip Factor=1−(QDOC/QEATS), calculate an AHI Flow Loss Factor=1−(QEATS/QAHI), and identify a malfunctioning AHI nozzle, DOC, DPF, or SCR by comparing each of calculated DOC HC Slip Factor, calculated AHI Flow Loss Factor, and measured NOX conversion efficiency with desired values.

According to yet another aspect of the present invention, a controller is provided for an exhaust after treatment system (EATS) for a diesel engine, the EATS comprising an AHI nozzle, a diesel oxidation catalyst (DOC) downstream from the AHI nozzle, a first temperature sensor upstream of the DOC, a diesel particulate filter (DPF) downstream of the DOC, a second temperature sensor downstream of the DOC and upstream of the DPF, a selective catalytic reduction catalyst system (SCR) downstream of the DPF, a third temperature sensor downstream of the DPF and upstream of the SCR, a first NOX sensor upstream of the SCR, and a second NOX sensor downstream of the SCR. The controller is arranged to determine heat released (QDOC) across the DOC during an AHI injection event based on a first temperature measurement signal and a second temperature measurement signal from the first temperature sensor and the second temperature sensor, respectively, determine heat released (QEATS) across the DOC and the DPF during the AHI injection event based on the first temperature measurement signal and a third temperature measurement signal from the first temperature sensor and the third temperature sensor, respectively, determine NOX conversion efficiency ($\eta$SCR) from NOX to N2 across the SCR while AHI is not in use based on NOX measurement signals from the first and second NOX sensors, calculate heat input from AHI fuel (QAHI) during performance of the AHI injection event with a fully functioning AHI nozzle, calculate a DOC HC Slip Factor=1−(QDOC/QEATS), calculate an AHI Flow Loss Factor=1−(QEATS/QAHI), and identify a malfunctioning AHI nozzle, DOC, DPF, or SCR by comparing each of calculated DOC HC Slip Factor, calculated AHI Flow Loss Factor, and measured NOX conversion efficiency with desired values.

BRIEF DESCRIPTION OF THE DRAWINGS

The features and advantages of the present invention are well understood by reading the following detailed description in conjunction with the drawings in which like numerals indicate similar elements and in which:

FIG. 3 is a table showing how malfunctioning components of an EATS are identified according to an aspect of the present invention.

DETAILED DESCRIPTION

Figure 1:
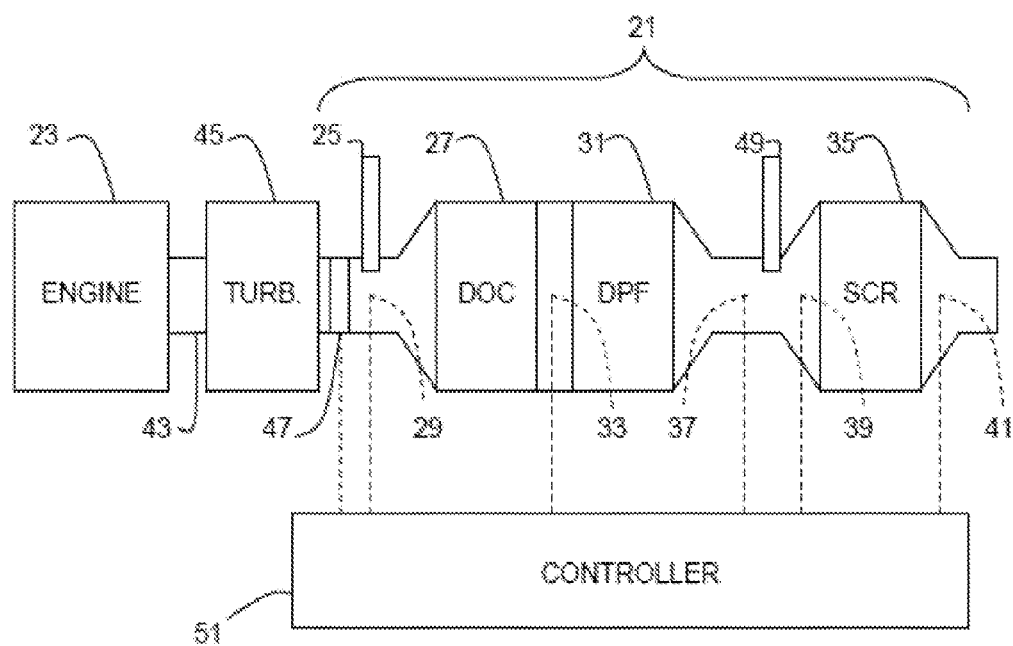
FIG. 1 is a schematic view of a diesel engine and EATS according to an aspect of the present invention.

FIG. 1 shows an exhaust after treatment system (EATS) 21 for a diesel engine 23. The EATS 21 comprises an AHI nozzle 25, a diesel oxidation catalyst (DOC) 27 downstream from the AHI nozzle, a first temperature sensor 29 upstream of the DOC, a diesel particulate filter (DPF) 31 downstream of the DOC, a second temperature sensor 33 downstream of the DOC and upstream of the DPF, a selective catalytic reduction catalyst system (SCR) 35 downstream of the DPF, a third temperature sensor 37 downstream of the DPF and upstream of the SCR, a first NOX sensor 39 upstream of the SCR, and a second NOX sensor 41 downstream of the SCR. A conduit 43 upstream of the DOC and connecting the EATS to the engine 23 typically includes a turbine 45 of a turbocharger and an arrangement 47, such as an orifice and flow meter for measuring, or control logic for calculating exhaust mass flow. A nozzle 49 connected to a source of DEF (not shown) is typically provided upstream of the SCR 35 and downstream of the DPF 31.

The EATS further comprises a controller 51, which may form part of a vehicle engine control unit (ECU) or other suitable computer. The controller 51 is arranged to determine heat released (QDOC) across the DOC 27 during an AHI injection event based on a first temperature measurement signal T1 and a second temperature measurement signal T2 from the first temperature sensor 29 and the second temperature sensor 33, respectively. The controller 51 is also arranged to determine heat released (QEATS) across the DOC 27 and the DPF 31 during the AHI injection event based on the first temperature measurement signal T1, ordinarily but not necessarily the second temperature measurement signal T2, and a third temperature measurement signal T3 from the first temperature sensor 29, the second temperature sensor 33, and third temperature sensor 37, respectively. The controller 51 is further arranged to measure NOX conversion efficiency (ηSCR), ordinarily at an operating condition with a combination of high exhaust mass flow and low SCR temperature, from NOX to N2 across the SCR 35 while the AHI is not in use based on NOX measurement signals from the first and second NOX sensors 39 and 41. The controller is arranged to 51 calculate theoretical heat input (QAHI) by a fully functioning AHI nozzle 25 during the AHI injection event. The controller 51 is arranged to calculate a "DOC HC Slip Factor":

$$\text{DOC HC Slip Factor} = 1 - (Q_{DOC}/Q_{EATS}), \quad (1)$$

and to calculate an AHI Flow Loss Factor:

$$\text{AHI Flow Loss Factor} = 1 - (Q_{EATS}/Q_{AHI}) \quad (2)$$

The controller 51 is arranged to identify a malfunctioning AHI nozzle 25, DOC 27, DPF 31, or SCR 35 by comparing each of calculated DOC HC Slip Factor, calculated AHI Flow Loss Factor, and measured NOX conversion efficiency with desired values. The desired values are established for a particular EATS by testing and/or modeling and may differ from system to system.

For a given vehicle, heat losses (HL) of after treatment components to ambient are affected by factors including vehicle speed ($v_{veh}$), ambient temperature ($T_{amb}$) and pressure ($P_{amb}$), exhaust temperature ($T_{exh}$), and exhaust mass flow rate ($\dot{m}_{exh}$). Thus, $HL = f(v_{veh}, T_{amb}, P_{amb}, T_{exh}, \dot{m}_{exh})$.

The controller 51 will typically determine QDOC over the AHI injection event according to the following equation:

$$Q_{DOC} = \int_{t_1}^{t_2} \dot{m}_{exh} c_{p,exh}(T_2 - T_1) dt + \\ m_{DOC} c_{cor} \left[ \left(\frac{T_1 + T_2}{2}\right)_{t_2} - \left(\frac{T_1 + T_2}{2}\right)_{t_1} \right] + \int_{t_1}^{t_2} \dot{H}L_{DOC} dt \quad (3)$$

where:
QDOC=heat released across the DOC
T1=temperature measured by first temperature sensor
T2=temperature measured by second temperature sensor
t1=time at beginning of AHI injection event
t2=time at end of AHI injection event
ṁexh=mass flow of exhaust
cp,exh=specific heat of exhaust gas
mDOC=mass of DOC
ccor=specific heat of cordierite material (here, as used in DOC)

The controller 51 will typically determine QEATS over the AHI injection event according to the following equation:

$$Q_{EATS} = \\ \int_{t_1}^{t_2} \dot{m}_{exh} c_{p,exh}(T_2 - T_1) dt + m_{DOC} c_{cor} \left[ \left(\frac{T_1 + T_2}{2}\right)_{t_2} - \left(\frac{T_1 + T_2}{2}\right)_{t_1} \right] + \\ m_{DPF} c_{cor} \left[ \left(\frac{T_2 + T_1}{2}\right)_{t_2} - \left(\frac{T_2 + T_1}{2}\right)_{t_1} \right] + \\ \int_{t_1}^{t_2} \dot{H}L_{DOC} dt + \int_{t_1}^{t_2} \dot{H}L_{DPF} dt \quad (4)$$

where:
QEATS=heat released across the DOC and the DPF
T3=temperature measured by third temperature sensor
mDPF=mass of DPF
ccor=specific heat of cordierite material (here, as used in DPF and DOC).

The controller 51 will typically determine QAHI over the AHI injection event by determining an amount of energy in fuel delivered during the AHI injection event if the AHI nozzle is properly functioning according to the following equation:

$$Q_{AHI} = \int_{t_1}^{t_2} \dot{m}_{AHI} \Delta h_{diesel} dt \quad (5)$$

where:
ṁAHI=nominal mass flow rate of fuel through AHI nozzle based on AHI fuel pressure and AHI injection event
hdiesel=lower heat value of diesel The controller 51 will typically determine NOX conversion efficiency (ηSCR) of the SCR 35 only after the engine 23 has been operating for a sufficient length of time that a downstream NOx sensor 41 reaches its operating temperature, the SCR is within what shall be defined for purposes of the present invention as its low operating temperature range (often 200° C. to 350° C. for an Fe-Zeolite SCR) and what shall be defined as the high end exhaust mass flow (ṁexh) operating range (often around 0.35-0.45 kg/s) where its NOx conversion efficiency relies more on feeding gas compositions. NOX conversion efficiency is typically determined according to an equation such as the following:

$$\eta SCR = [1-(NOX1-NOX2)/NOX1] \times 100 \quad (6)$$

where:

η SCR=NOX conversion efficiency

NOX1=NOX measurement at first NOX sensor

NOX2=NOX measurement at second NOX sensor

Figure 2:
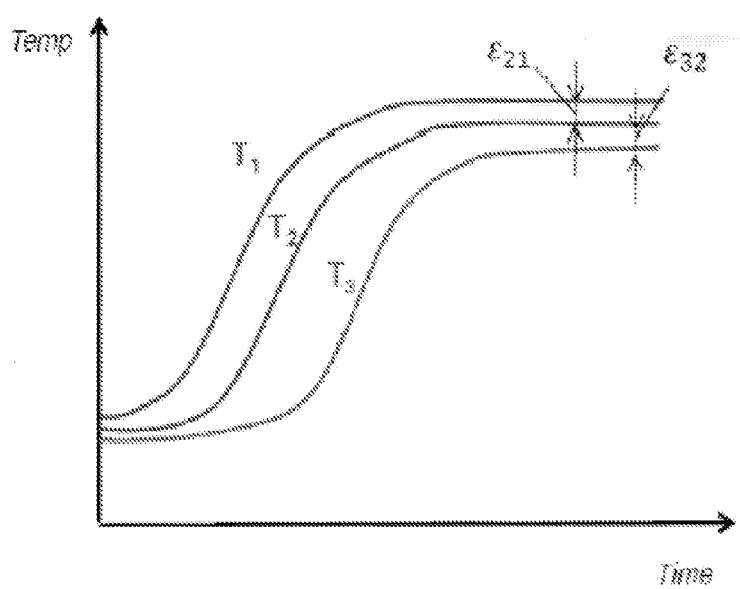
FIG. 2 is a graph of temperature deviations due to losses and other error factors in an EATS.

Due to temperature sensor variability and heat losses from the EATS 21 to the ambient environment, raw temperature measurements T1raw, T2raw, and T3raw of the first, second, and third temperature sensors 29, 33, and 37 will not ordinarily satisfy the requirement of conservation of energy. For example, under a strict steady state condition with a fixed exhaust mass flow and fixed engine out temperature, T2raw and T3raw will deviate from T1 in the general manner seen in the graph shown in FIG. 2, and according to the equations below:

$$T1 = T2\text{raw} + \epsilon 21 \quad (7)$$

$$T2\text{raw} = T3\text{raw} + \epsilon 32 \quad (8)$$

where:

$\epsilon 21$=deviation factor between first and second temperature $\epsilon 32$=deviation factor between second and third temperature The deviation factors $\epsilon 21$ and $\epsilon 32$ can be approximated as constants for a typical temperature range of the diesel engine, such as a range of 200° C. to 400° C. The deviation factors are to compensate the raw readings of the second temperature sensor and of the third temperature sensor against the reading of the first temperature sensor, so that energy conservation equation can be maintained better for robust EATS component monitoring. The two deviation factors are not to compensate the raw readings of the three temperature sensors to their respective actual temperatures. The values of the two deviation factors can be estimated based on energy conservation when no AHI injection is being performed. Temperature sensors do not typically degrade very fast, so compensation for inaccurate sensors will likely be an infrequent event, such as around once a month.

To determine $\epsilon 21$ and $\epsilon 32$, under principles of energy conservation where:

$$0 = \text{Heat out} + \text{Heat storage} - \text{Heat in} \quad (9)$$

the following equation applies for the DOC:

$$0 = \int_{t_3}^{t_4} \dot{m}_{exh} c_{p,exh}[(T_{2\_raw} + \epsilon_{21}) - T_1]dt + \quad (10)$$

$$m_{DOC} c_{cor}\left[\left(\frac{t_1 + (t_{2\_raw} + \epsilon_{21})}{2}\right)_{t_4} - \left(\frac{t_1 + (t_{2\_raw} + \epsilon_{21})}{2}\right)_{t_3}\right] + \int_{t_3}^{t_4} \dot{H}L_{DOC} dt$$

and the following equation applies for the DPF:

$$0 = \int_{t_2}^{t_4} \dot{m}_{exh} c_{p,exh}[(T_{3\_raw} + \epsilon_{32}) - T_{2\_raw}]dt + m_{DPF} \quad (11)$$

$$c_{cor}\left[\left(\frac{T_{2\_raw} + (T_{3raw} + \epsilon_{32})}{2}\right)_{t_4} - \left(\frac{T_{2\_raw} + (T_{3raw} + \epsilon_{32})}{2}\right)_{t_3}\right] + \int_{t_3}^{t_4} \dot{H}L_{DPF} dt$$

Solving equation (10) for $\epsilon 21$ provides:

$$\epsilon_{21} = \frac{\int_{t_3}^{t_4} \dot{m}_{exh}(T_1 - T_{2\_raw})dt}{\int_{t_2}^{t_4} \dot{m}_{exh} dt} - \quad (12)$$

$$\frac{c_{cor} m_{DOC}}{c_{p,exh} \int_{t_3}^{t_4} \dot{m}_{exh} dt}\left[\left(\frac{T_1 + T_{2raw}}{2}\right)_{t_4} - \left(\frac{T_1 + T_{2raw}}{2}\right)_{t_3}\right] - $$

$$\frac{\int_{t_2}^{t_4} \dot{H}L_{DOC} dt}{c_{p,exh} \int_{t_3}^{t_4} \dot{m}_{exh} dt}$$

and solving equation 11 for $\epsilon 32$ provides:

$$\epsilon_{32} = \frac{\int_{t_2}^{t_4} \dot{m}_{exh}(T_{2\_raw} - T_{3\_raw})dt}{\int_{t_3}^{t_4} \dot{m}_{exh} dt} - \quad (13)$$

$$\frac{c_{cor} m_{DPF}}{c_{p,exh} \int_{t_3}^{t_4} \dot{m}_{exh} dt}\left[\left(\frac{T_{2raw} + T_{3raw}}{2}\right)_{t_4} - \left(\frac{T_{2raw} + T_{3raw}}{2}\right)_{t_3}\right] - $$

$$\frac{\int_{t_3}^{t_4} \dot{H}L_{DPF} dt}{c_{p,exh} \int_{t_2}^{t_4} \dot{m}_{exh} dt}$$

It will be understood that references to T2 and T3 herein can refer to the actual measured temperatures modified to compensate for factors such as temperature sensor variability and heat losses from the EATS 21 to the ambient environment.

The controller 51 is arranged to identify a malfunctioning AHI nozzle 25 by determining that:

the AHI Flow Loss Factor is above a desired range >R2, and the NOX conversion efficiency is within a desired range R3.

The controller 51 is arranged to identify a malfunctioning DOC 27 by determining that the DOC HC Slip Factor is above a desired range >R1, the AHI Flow Loss Factor is above a desired range >R2, and the NOX conversion efficiency is below a desired range <R3.

The controller 51 is arranged to identify a malfunctioning DPF 31 by determining that:

the DOC HC Slip Factor is below a desired range <R1, the AHI Flow Loss Factor is above a desired range >R2, and the NOX conversion efficiency is below a desired range <R3.

The controller 51 is arranged to identify both a malfunctioning DOC and a malfunctioning DPF by determining that:
  the DOC HC Slip Factor is within a desired range R1,
  the AHI Flow Loss Factor is above a desired range >R2, and
  the NOX conversion efficiency is below a desired range <R3.

The controller 51 is arranged to identify a potentially malfunctioning SCR 35 by determining that:
  the AHI Flow Loss Factor is within a desired range R2, and
  the NOX conversion efficiency is below a desired range <R3.

FIG. 3 is a table showing how the foregoing symptoms correspond to the foregoing diagnoses. FIG. 3 shows (in parentheses) illustrative values for the DOC HC Slip Factor, the AHI Flow Loss Factor, and the NOX conversion efficiency under the four scenarios outlined above. The expression "end-of-life" and the expression "limit" are terms of art in the industry that, for purposes of the present invention, can be understood to mean "properly functioning normally degraded at end of the design life" and "malfunctioning exceeding the monitoring legal limit", respectively.

The symptoms for a potentially malfunctioning SCR 35 may reflect issues other than a malfunctioning SCR, however, they can suggest one possible source of a problem. NOX conversion efficiency is ordinarily determined when the SCR 35 is operating within a predetermined temperature range and within a predetermined exhaust mass flow rate. Performance of the AHI nozzle does not typically directly affect operation of the SCR 35. However, as the AHI Flow Loss Factor is relevant to a diagnosis of a potentially malfunctioning SCR 35, the controller 51 can be arranged, after determining that the NOX conversion efficiency is below a desired range, to automatically initiate an AHI injection event. Alternatively, the AHI injection event may only be initiated by an operator actively calling for initiating of the AHI injection event. This may, of course, be performed in response to, for example, a warning signal to the operator advising of now NOX conversion efficiency.

A method for monitoring components in an EATS for a diesel engine is described in connection with the engine 23 and EATS 21 shown in FIG. 1, the EATS comprising, in order from upstream to downstream, an AHI nozzle 25, a DOC 27, a DPF 31, and a SCR 35. According to the method, heat released (QDOC) across the DOC 27 during an AHI injection event is measured. Measuring QDOC can comprise measuring a first temperature T1 upstream of the DOC 27, and measuring a second temperature T2 downstream of the DOC and upstream of the DPF 31. QDOC is typically determined according to equation 3), above.

According to the method, heat released (QEATS) across the DOC 27 and the DPF 31 during the AHI injection event is measured. Measuring QEATS can comprise measuring the first temperature T1 upstream of the DOC 27, measuring a second temperature downstream of DOC 27 and upstream of DPF 31, and measuring a third temperature downstream of the DPF 31. QEATS is typically determined according to equation 4), above.

According to the method, NOX conversion efficiency ($\eta$SCR) from NOX to N2 across the SCR 35 is measured at some time while AHI is not in use, typically by measuring NOX levels by sensors 39 and 41 upstream and downstream from the SCR and calculating NOX conversion efficiency according to equation 6), above.

According to the method, heat input (QAHI) during performance of the AHI injection with a fully functioning AHI nozzle is calculated. Calculating QAHI comprises determining an amount of energy in fuel delivered during the AHI injection event if the AHI nozzle 25 is properly functioning. QAHI is typically calculated according to equation 5), above.

According to the method, the DOC HC Slip Factor (=1−(QDOC/QEATS)) and the AHI Flow Loss Factor (=1−(QEATS/QAHI)) are calculated.

A malfunctioning AHI nozzle, DOC, DPF, or SCR is identified by comparing each of calculated DOC HC Slip Factor, calculated AHI Flow Loss Factor, and measured NOX conversion efficiency with desired values. The table in FIG. 3 shows how different combinations of symptoms can be used to identify a malfunctioning or potentially malfunctioning component.

Figure 4:
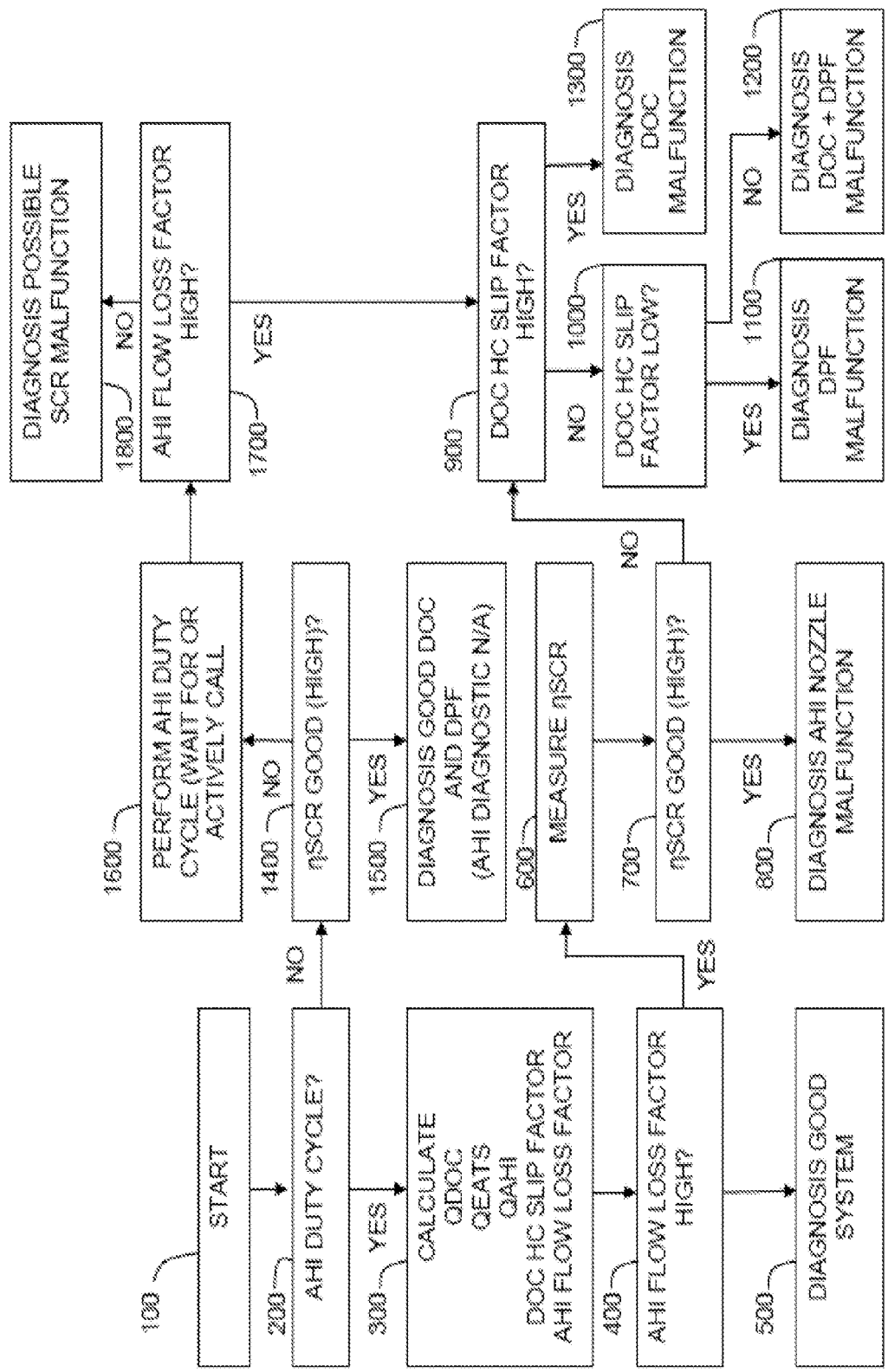
FIG. 4 is a flow chart showing a series of steps in a method of diagnosing malfunctioning components of an EATS according to an aspect of the present invention.

The flow chart in FIG. 4 illustrates by means of a series of steps how a diagnosis of a properly or improperly functioning component can be made. After starting an engine at step 100, if an AHI injection event is performed at step 200, then QDOC, QEATS, and QAHI are calculated at step 300, along with the DOC HC Slip Factor and the AHI Flow Loss Factor. If it is determined at step 400 that the AHI Flow Loss Factor is within a desired range, a diagnosis at step 500 is that the components of the AHI, DOC, and DPF are functioning properly.

If it is determined at step 400 that the AHI Flow Loss Factor is high, after the engine 23 is operating at desired conditions for measuring NOX conversion efficiency, sometimes referred to as high exhaust mass flow and low SCR temperature conditions, (for example, temperatures around 200° C. to 350° C. and the exhaust mass flow around 0.35-0.45 kg/s), NOX conversion efficiency is measured at step 600. If NOX conversion efficiency is determined at step 700 to be at or above a desired range, a diagnosis at step 800 is that there is a bad AHI nozzle 25.

If NOX conversion efficiency is determined at step 700 to be below a desired range, if it is then determined at step 900 that the HC Slip Factor is not above a desired range and, at step 1000, it is determined that the HC Slip Factor is below a desired range, the diagnosis at step 1100 is that the DPF 31 is malfunctioning. If it is determined at step 1000 that the HC Slip Factor is within a desired range, i.e., neither high nor low, the diagnosis at step 1200 is that the combination of DOC 27 and the DPF 31 are malfunctioning. If it is determined at step 900 that the HC Slip Factor is above a desired range, the diagnosis at step 1300 is that the DOC 27 is malfunctioning.

If, after starting the engine at step 100, no AHI injection event is performed at step 200, such as following a start of a warmed up engine, after desired conditions for measuring NOX conversion efficiency are attained, if NOX conversion efficiency is determined at step 1400 to be at or above a desired range, the diagnosis at step 1500 is that the components of the DOC, DPF, and SCR are functioning properly. AHI nozzle diagnosis is not applicable because the AHI nozzle has not been used since the engine was started.

If it is determined at step 1400 that NOX conversion efficiency is below a desired range, an AHI injection event is performed at step 1600, either by waiting for the normal occurrence of the AHI injection event or actively calling for performance of the AHI injection event, either automatically or by manual initiation by an operator.

If, following performance of the AHI injection event, it is determined at step 1800 that the AHI Flow Loss Factor is high, a determination is then made at steps 900 and 1000 that the HC Slip Factor is below a desired range, and the diagnosis at step 1100 is that the DPF 31 is malfunctioning. If it is determined at steps 900 and 1000 that the HC Slip Factor is within a desired range, the diagnosis at step 1200 is that the combination of the DOC and the DPF are malfunctioning. If it is determined at step 900 that the HC Slip Factor is above a desired range, the diagnosis at step 1300 is that the DOC 27 is malfunctioning.

If, following performance of the AHI injection event, it is determined at step 1700 that the AHI Flow Loss Factor is within a desired range, it is presumed that the AHI nozzle 25, the DOC 27, and the DPF 31 are functioning properly, which suggests a diagnosis at step 1800 that the cause for the low NOX conversion efficiency is a malfunctioning SCR, which can be more definitely identified by dedicated SCR monitors.

According to the present invention, sensors such as temperature sensors or NOX sensors that are ordinarily already present in an EATS or that can be added at minimal cost can be adapted for use in diagnosing malfunctioning components.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the Failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A method for monitoring components in an exhaust after treatment system (EATS) for a diesel engine, the EATS comprising, in order from upstream to downstream, an AHI (Advanced Hydrocarbon Injection) nozzle, a diesel oxidation catalyst (DOC), a diesel particulate filter (DPF), and a selective catalytic reduction catalyst system (SCR), comprising:
   measuring heat released (QDOC) across the DOC during an AHI injection event;
   measuring heat input from AHI fuel (QEATS) across the DOC and the DPF during the AHI injection event;
   measuring NOX conversion efficiency ($\eta$SCR) from NOX to N2 across the SCR while AHI is not in use;
   calculating heat input from AHI fuel (QAHI) during performance of the AHI injection event with a fully functioning AHI nozzle;
   calculating a DOC HC Slip Factor=1−(QDOC/QEATS);
   calculating an AHI Flow Loss Factor=1−(QEATS/QAHI); and
   identifying a malfunctioning AHI nozzle, DOC, DPF, or SCR by comparing each of calculated DOC HC Slip Factor, calculated AHI Flow Loss Factor, and measured NOX conversion efficiency with desired values.

2. The method as set forth in claim 1, wherein measuring QDOC comprises measuring a first temperature upstream of the DOC, and measuring a second temperature downstream of the DOC and upstream of the DPF.

3. The method as set forth in claim 2, wherein measuring QEATS comprises measuring the first temperature upstream of the DOC, measuring the second temperature downstream of the DOC and upstream of the DPF, and measuring a third temperature downstream of the DPF.

4. The method as set forth in claim 3, wherein measuring QDOC and QEATS comprises adjusting the measured second temperature and the measured third temperature to exclude heat losses from the DOC and the DPF to an ambient environment.

5. The method as set forth in claim 1, wherein calculating QAHI comprises determining an amount of energy in fuel delivered during the AHI injection event if the AHI nozzle is properly functioning.

6. The method as set forth in claim 1, wherein a malfunctioning AHI nozzle is identified by determining that
   the AHI Flow Loss Factor is above a desired range, and
   the NOX conversion efficiency is within a desired range.

7. The method as set forth in claim 1, wherein a malfunctioning DOC is identified by determining that
   the DOC HC Slip Factor is above a desired range,
   the AHI Flow Loss Factor is above a desired range, and
   the NOX conversion efficiency is below a desired range.

8. The method as set forth in claim 1, wherein a malfunctioning DPF is identified by determining that
   the DOC HC Slip Factor is below a desired range,
   the AHI Flow Loss Factor is above a desired range, and
   the NOX conversion efficiency is below a desired range.

9. The method as set forth in claim 1, wherein a malfunctioning DOC and DPF combination is identified by determining that
   the DOC HC Slip Factor is within a desired range,
   the AHI Flow Loss Factor is above a desired range, and
   the NOX conversion efficiency is below a desired range.

10. The method as set forth in claim 1, wherein a malfunctioning SCR is identified by determining that
    the AHI Flow Loss Factor is within a desired range, and
    the NOX conversion efficiency is below a desired range.

11. The method as set forth in claim 10, comprising, after determining that the NOX conversion efficiency is below a desired range, automatically initiating an AHI injection event.

12. The method as set forth in claim 1, comprising measuring the NOX conversion efficiency when a temperature of the SCR and a diesel engine exhaust flow rate are within predetermined ranges.

13. An exhaust after treatment system (EATS) for a diesel engine, the EATS comprising:
    an AHI (Advanced Hydrocarbon Injection) nozzle;
    a diesel oxidation catalyst (DOC) downstream from the AHI nozzle;
    a first temperature sensor upstream of the DOC;
    a diesel particulate filter (DPF) downstream of the DOC;
    a second temperature sensor downstream of the DOC and upstream of the DPF;
    a selective catalytic reduction catalyst system (SCR) downstream of the DPF;
    a third temperature sensor downstream of the DPF and upstream of the SCR;
    a first NOX sensor upstream of the SCR;
    a second NOX sensor downstream of the SCR; and
    a controller configured to
       determine heat released (QDOC) across the DOC during an AHI injection event based on a first temperature measurement signal and a second temperature measurement signal from the first temperature sensor and the second temperature sensor, respectively,
       determine heat released (QEATS) across the DOC and the DPF during the AHI injection event based on the first temperature measurement signal and a third temperature measurement signal from the first temperature sensor and the third temperature sensor, respectively,
    determine NOX conversion efficiency ($\eta$SCR) from NOX to N2 across the SCR while AHI is not in use based on NOX measurement signals from the first and second NOX sensors;

calculate heat input from AHI fuel (QAHI) during performance of the AHI injection event with a fully functioning AHI nozzle;
    calculate a DOC HC Slip Factor=1−(QDOC/QEATS);
    calculate an AHI Flow Loss Factor=1−(QEATS/QAHI); and
    identify a malfunctioning AHI nozzle, DOC, DPF, or SCR by comparing each of calculated DOC HC Slip Factor, calculated AHI Flow Loss Factor, and measured NOX conversion efficiency with desired values.

14. The EATS as set forth in claim 13, wherein the controller is configured to adjust the measured second temperature signal and the measured third temperature signal to exclude sensor variability when determining QDOC and QEATS.

15. The EATS as set forth in claim 13, wherein the controller is configured to calculate QAHI by determining an amount of energy in fuel delivered during the AHI injection event if the AHI nozzle is properly functioning.

16. The EATS as set forth in claim 13, wherein the controller is configured to identify a malfunctioning AHI nozzle by determining that
    the DOC HC Slip Factor is within a desired range,
    the AHI Flow Loss Factor is above a desired range, and
    the NOX conversion efficiency is within a desired range.

17. The EATS as set forth in claim 13, wherein the controller is arranged configured to identify a malfunctioning DOC by determining that
    the DOC HC Slip Factor is above a desired range,
    the AHI Flow Loss Factor is above a desired range, and
    the NOX conversion efficiency is below a desired range.

18. The EATS as set forth in claim 13, wherein the controller is arranged configured to identify a malfunctioning DPF by determining that
    the DOC HC Slip Factor is below a desired range,
    the AHI Flow Loss Factor is above a desired range, and
    the NOX conversion efficiency is below a desired range.

19. The EATS as set forth in claim 13, wherein the controller is arranged configured to identify a malfunctioning SCR by determining that
    the AHI Flow Loss Factor is within a desired range, and
    the NOX conversion efficiency is below a desired range.

20. The EATS as set forth in claim 19, wherein the controller is configured, after determining that the NOX conversion efficiency is below a desired range, to automatically initiate an AHI injection event.

21. A controller for an exhaust after treatment system (EATS) for a diesel engine, the EATS comprising an AHI (Advanced Hydrocarbon Injection) nozzle, a diesel oxidation catalyst (DOC) downstream from the AHI nozzle, a first temperature sensor upstream of the DOC, a diesel particulate filter (DPF) downstream of the DOC, a second temperature sensor downstream of the DOC and upstream of the DPF, a selective catalytic reduction catalyst system (SCR) downstream of the DPF, a third temperature sensor downstream of the DPF and upstream of the SCR, a first NOX sensor upstream of the SCR, and a second NOX sensor downstream of the SCR,
    the controller being configured to
    determine heat released (QDOC) across the DOC (hiring an AHI injection event based on a first temperature measurement signal and a second temperature measurement signal from the first temperature sensor and the second temperature sensor, respectively,
    determine heat released (QEATS) across the DOC and the DPF during the AHI injection event based on the first temperature measurement signal and a third temperature measurement signal from the first temperature sensor and the third temperature sensor, respectively,
    determine NOX conversion efficiency ($\eta$SCR) from NOX to N2 across the SCR while AHI is not in use based on NOX measurement signals from the first and second NOX sensors;
    calculate heat input from AHI fuel (QAHI) during performance of the AHI injection event with a fully functioning AHI nozzle;
    calculate a DOC HC Slip Factor=1−(QDOC/QEATS);
    calculate an AHI Flow Loss Factor=1−(QEATS/QAHI); and
    identify a malfunctioning AHI nozzle, DOC, DPF, or SCR by comparing each of calculated DOC HC Slip Factor, calculated AHI Flow Loss Factor, and measured NOX conversion efficiency with desired values.

\* \* \* \* \*

UNITED STATES PATENT AND TRADEMARK OFFICE
CERTIFICATE OF CORRECTION

| | | |
|---|---|---|
| PATENT NO. | : 9,115,631 B2 | Page 1 of 1 |
| APPLICATION NO. | : 14/400604 | |
| DATED | : August 25, 2015 | |
| INVENTOR(S) | : Qunlong Dong et al. | |

It is certified that error appears in the above-identified patent and that said Letters Patent is hereby corrected as shown below:

On The Title Page,

Item (75) Inventors:

Change the name of the second inventor from "Chun Tal" to -- Chun Tai --.

Item (73) Assignee:

Change the state of the assignee from "NY" to -- NC --.

Signed and Sealed this
Twenty-ninth Day of December, 2015

Michelle K. Lee
*Director of the United States Patent and Trademark Office*